(12) United States Patent
Bestmann et al.

(10) Patent No.: US 9,319,270 B2
(45) Date of Patent: Apr. 19, 2016

(54) CONFIGURATION OF THIRD PARTY APPLICATIONS IN A SANDBOXED ENVIRONMENT

(71) Applicant: FrontRange Solutions Inc., Milpitas, CA (US)

(72) Inventors: Martin Bestmann, Neunkirchen am Brand (DE); Jeremy Cartier, Denman Island (CA); Jens Miltner, Neunkirchen (DE)

(73) Assignee: FrontRange Solutions, Inc., Milpitas, CA (US)

( * ) Notice: Subject to any disclaimer, the term of this patent is extended or adjusted under 35 U.S.C. 154(b) by 408 days.

(21) Appl. No.: 13/861,653

(22) Filed: Apr. 12, 2013

(65) Prior Publication Data

US 2013/0275560 A1 Oct. 17, 2013

Related U.S. Application Data

(60) Provisional application No. 61/623,489, filed on Apr. 12, 2012.

(51) Int. Cl.
*G06F 15/16* (2006.01)
*H04L 12/24* (2006.01)

(52) U.S. Cl.
CPC ............ *H04L 41/08* (2013.01); *H04L 41/0803* (2013.01)

(58) Field of Classification Search
USPC .................................. 709/219, 200, 223, 220
See application file for complete search history.

(56) References Cited

U.S. PATENT DOCUMENTS

| | | |
|---|---|---|
| 5,715,174 A | 2/1998 | Cotichini et al. |
| 5,764,892 A | 6/1998 | Cain et al. |
| 5,802,280 A | 9/1998 | Cotichini et al. |
| 5,987,611 A | 11/1999 | Freund |
| 6,244,758 B1 | 6/2001 | Solymar et al. |
| 6,269,392 B1 | 7/2001 | Cotichini et al. |
| 6,300,863 B1 | 10/2001 | Cotichini et al. |
| 6,507,914 B1 | 1/2003 | Cain et al. |
| 6,549,887 B1 | 4/2003 | Ando et al. |
| 7,069,554 B1 | 6/2006 | Stammers et al. |
| 7,945,709 B2 | 5/2011 | Cain et al. |
| 8,224,934 B1 | 7/2012 | Dongre et al. |
| 8,788,885 B1 * | 7/2014 | Cook et al. .................... 714/38.1 |
| 8,799,862 B2 * | 8/2014 | Adamson ....................... 717/124 |
| 2003/0196114 A1 | 10/2003 | Brew et al. |
| 2004/0123270 A1 * | 6/2004 | Zhuang et al. ................ 717/118 |
| 2005/0216757 A1 | 9/2005 | Gardner |
| 2006/0272020 A1 | 11/2006 | Gardner |

(Continued)

OTHER PUBLICATIONS

Written Opinion issued Jul. 16, 2013 in PCT/CA2013/000346 of Absolute Software Corporation.

(Continued)

*Primary Examiner* — El Hadji Sall
(74) *Attorney, Agent, or Firm* — Knobbe, Martens, Olson & Bear, LLP

(57) ABSTRACT

A profile manager application is installed in an electronic device that fetches configuration profiles for third party applications from a remote server. Using code libraries incorporated in the third party applications and URL based commands, the profile manager application communicates with the third party applications to configure them according to the corresponding configuration profiles, even though the third party applications are running in a sandboxed environment.

20 Claims, 4 Drawing Sheets

(56) References Cited

U.S. PATENT DOCUMENTS

| | | | |
|---|---|---|---|
| 2010/0250653 A1* | 9/2010 | Hudgeons et al. | 709/203 |
| 2010/0281102 A1* | 11/2010 | Chinta et al. | 709/203 |
| 2011/0173251 A1* | 7/2011 | Sandhu et al. | 709/203 |
| 2012/0040657 A1 | 2/2012 | Krco et al. | |
| 2012/0284513 A1 | 11/2012 | Yerli | |
| 2012/0289147 A1 | 11/2012 | Raleigh et al. | |
| 2012/0331441 A1* | 12/2012 | Adamson | 717/102 |
| 2013/0210418 A1* | 8/2013 | Cannon et al. | 455/420 |
| 2014/0298298 A1* | 10/2014 | Cook et al. | 717/125 |
| 2014/0344786 A1* | 11/2014 | Adamson | 717/124 |

OTHER PUBLICATIONS

International Search Report issued Jul. 16, 2013 in PCT/CA2013/000346 of Absolute Software Corporation.

* cited by examiner

CONFIGURATION OF THIRD PARTY APPLICATIONS IN A SANDBOXED ENVIRONMENT

RELATED APPLICATIONS

This application claims the benefit of U.S. Provisional Patent Application No. 61/623,489 filed on Apr. 12, 2012, the disclosure of which is hereby incorporated by reference.

TECHNICAL FIELD

The present disclosure relates to the communication between third party applications in a sandboxed environment on an electronic device. More particularly, it relates to a system, method and application employing such communication for the configuration of third party applications.

BACKGROUND

A shortcoming in some operating systems, such as iOS, is that third party applications (also called "apps") cannot be configured using configuration profiles within the operating system. Configuration profiles within the operating system can be used for configuring parts of the operating system and for controlling certain hardware functionality of the device. As there is no support in this respect for third party apps, each third party app must be configured by the user of the device, unless the user simply wishes to use whatever default configuration is provided by the third party app.

A sandbox is a security mechanism employed in some operating systems for isolating running programs. It is often used to execute programs from third parties, for example. The sandbox typically provides a limited set of resources for the programs to run in, which are usually less than the full set of resources that are available on the device and that would be available to the OS itself. By limiting what third party programs can do, sandboxing reduces the conflict between programs and the likelihood of crashes, improving the apparent reliability of the programs. It also protects the device from malware and other malicious code that can be injected into running applications.

A drawback of sandboxing may be seen in a corporate scenario. If a company wishes its employees to install a particular third party app on their mobile devices, then it may be the case that the third party app needs to be configured according to the requirements of the company. The problem is that many employees will have difficulty configuring the third party apps the way the company requires, which may involve entering server and/or port addresses. Even for those with competence in this area, there is still the possibility of making typing errors, and there may be some reluctance or procrastination on the part of the employees to actually carry out the configuration.

SUMMARY

While sandboxing can be beneficial, one of its drawbacks is that third party applications are not intended to communicate with each other, and cannot readily do so. However, it would be useful to somehow use one third party application to configure other third party applications.

Disclosed herein are a system and process for configuring third party applications in a sandboxed environment on a mobile electronic device. Third party app developers are provided with special libraries that they can add to their code. Third party apps with the included libraries are able to communicate with other third party apps that include complementary libraries or code and are installed in the same mobile device. Communication between the third party apps is two way and occurs via URL commands containing the data that is to be communicated, and occurs even when the third party apps are in a sandboxed environment. As an example, a profile manager app, provided by a company, may be used to provide configuration profiles to several other third party apps installed on employee devices.

This summary is not an extensive overview intended to delineate the scope of the subject matter that is described and claimed herein. The summary presents aspects of the subject matter in a simplified form to provide a basic understanding thereof, as a prelude to the detailed description that is presented below. Nothing in this summary or the following detailed description (including the appendices) is intended to imply that any particular feature, component or characteristic is essential to the invention; the scope of protection is defined by the claims.

BRIEF DESCRIPTION OF THE DRAWINGS

For a fuller understanding of the nature and advantages of the disclosed subject matter, as well as the preferred mode of use thereof, reference should be made to the following detailed description, read in conjunction with the accompanying drawings. The drawings are intended to be illustrative, and therefore should not be used to limit the invention. In the following drawings, like reference numerals designate like or similar parts or steps.

GLOSSARY

Figure 1:
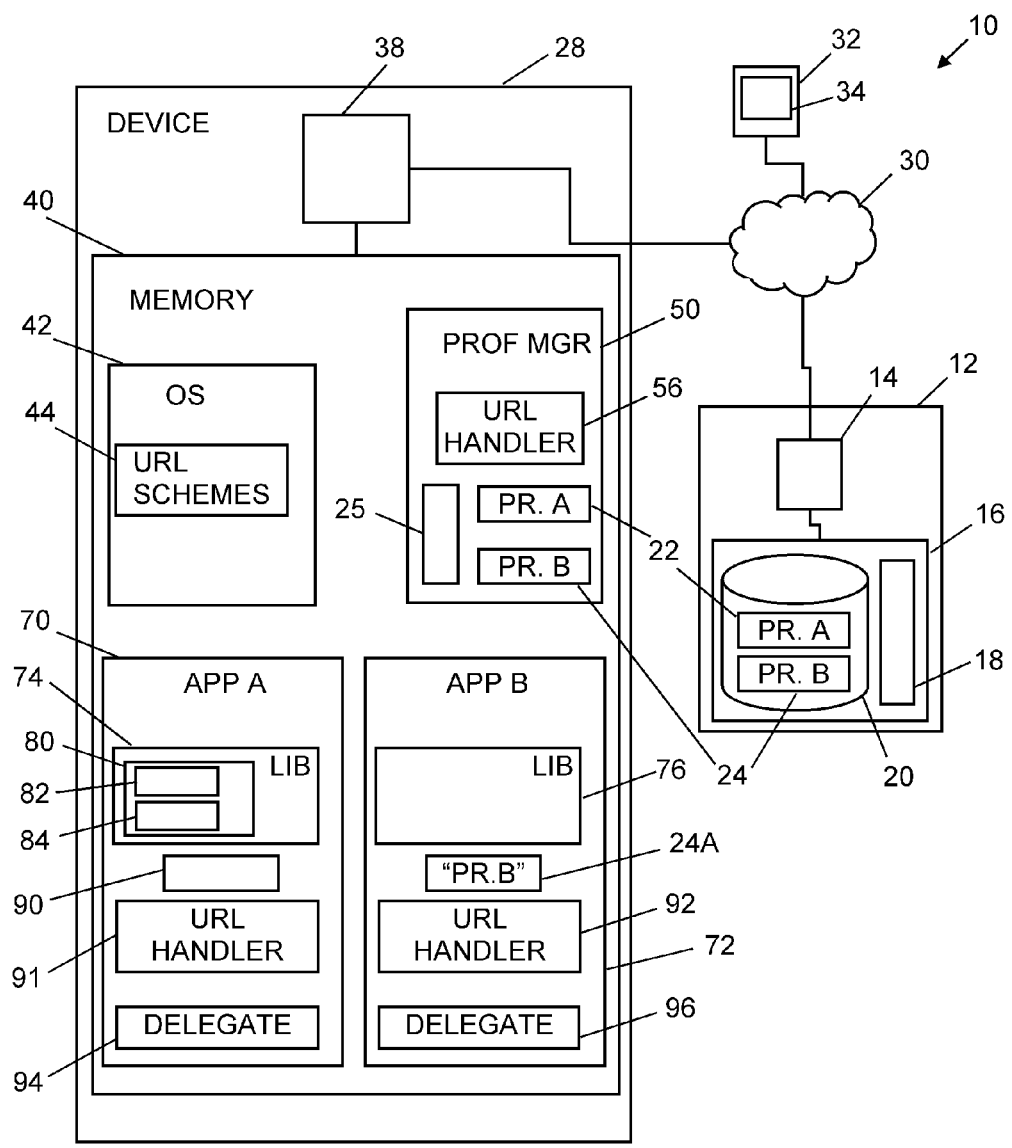
FIG. 1 is a schematic functional block diagram of a system for configuring third party apps.

Mobile Device—This refers to any portable electronic device such as a laptop, a notebook, a netbook, a tablet, an electronic book, a smart phone, a game console, and any other portable computing device.

Third Party App—A software application that can be installed on a mobile device, typically written by an individual or company other than the company providing the operating system for the device. Well known examples of third party apps include the Facebook™ and LinkedIn™ apps. These are different from built-in apps, such as YouTube™ and iTunes™ which are, or have been, included with the operating system of the mobile device and do not usually require a separate installation. Third party apps for some mobile devices may fall into two different categories, these being apps that are made available to the general public through an app store and apps that are not made generally available. These latter apps are called enterprise apps or in-house apps and are usually distributed by a company to a limited, but possibly large, number of employees or other users. This invention disclosed herein applies to both categories of third party app. When used herein, the term "third party app" relates predominantly to third party apps other than the profile manager app, described below.

Third Party Code—Programming instructions in a third party app.

Profile Manager App—This is a third party application that can be installed on a mobile device and forms part of some embodiments of the present invention. It receives and stores configuration profiles from a remote server and makes them available to other third party apps.

Configuration Profile—Software applications generally present the user with a choice of various settings. For example, one of the settings for a weather application may require a user to set a home town, for which the weather is to be forecast. Another setting for the weather application may be whether the view displayed on the screen of the mobile device should be hourly or daily. Another typical example of a configuration profile, which is particularly common for in-house apps, is the setting of a server address and a port number. Sometimes the configuration profile of an app is referred to as its settings. In other cases, certain functional features of the mobile device, its operating system or settings of built-in apps may be set by a configuration profile. This may be recommended by the providers of third party apps, or required by administrators, and may involve controlling access to email, use of the camera, WiFi, etc. While the present invention relates to the setting of configuration profiles for third party apps, it may also include functionality for the setting of configuration profiles for device features, the operating system and/or built-in apps. Note that an app may have multiple configuration profiles, each configuring different parts of the app.

Configuration Profile Settings—A third party app uses the settings in a configuration profile to configure itself. This could involve saving the configuration settings in a store in the third party app. The configuration profile itself as a whole is not sent to nor stored by the third party app. The configuration profile is only stored by the profile manager app.

URL Scheme—Sometimes referred to as a URL protocol handler. For a third party app to be opened by a link or another third party app, a URL scheme typically must be registered with the operating system, and the third party app to be opened typically must be registered as such. Whenever a URL command is invoked, the operating system checks that it corresponds to the registered format contained in the URL scheme before processing the command.

Delegate—A design pattern used in software development, which is like a subroutine to which values can be passed and from which response values can be received. Delegation is where a controller defines a protocol (e.g., a set of method definitions) describing what a delegate object must do in order to be allowed to respond to a controller's events. This allows the controller to call methods on its delegate with the knowledge that the delegate will respond to the method calls. Other software patterns that provide similar results may be used instead, such as forwarding, inheritance, mixins, callback methods or functions (including closures).

Library—A portion of computer readable code that is typically used in common by several applications. Libraries may be stored separately from the applications or they may be incorporated. Certain parts of a library or the third party app using it may be customized. When used herein, the term "library" generally refers to the library of the present invention, supplied to the third party apps.

API—Application Programming Interface. A source code based structure that allows software components to communicate with each other.

System

An embodiment of a system 10 for configuring third party apps is shown in FIG. 1. The system 10 comprises one or more servers 12 having one or more processors 14 connected to one or more non-transient computer readable media or memories 16. Memory 16 stores computer readable instructions 18 that, when processed by the processor 14, cause the system 10 to function according to the process described herein. Memory 16 also stores data 20, which includes one or more configuration profiles 22, 24 that are to be installed on one or more remote electronic devices 28 and applied to third party apps 70, 72 on those devices. Identification of the devices 28 and the third party apps 70, 72 is also stored in memory 16. The server 12 is connected to a network 30, which may, for example, include the internet, a telecommunications network, or both. A terminal 32 is connected to the network 30. An administrator may use a mobile device management console 34 running on or accessible at the terminal 32 to enter data and manage the configuration profiles 22, 24 and the devices 28 and third party apps 70, 72 to which they should be applied.

One or more devices 28 are connectable to network 30, each including one or more processors 38 that control operation of the device, including communication with the server 12. Connections to the network 30 may be wired or wireless. The processor 38 is connected to one or more non-transient computer readable media, or memory 40. The memory 40 stores an operating system 42 for the device 38. Within the operating system 42, one or more registered URL schemes 44 are stored. When a URL is used to open a third party app, its format must conform to a registered URL scheme, and the third party app to which it is bound must be installed on the device 28.

When a third party app 70, 72 is installed, its URL scheme 44 is registered inside the OS 42. The registration of the URL scheme 44 is performed by the third party app 70, 72 and not by the profile manager app 50, also stored in memory 40. The profile manager app 50 does not need to know anything about the specific third party apps 70, 72 that it can manage. The benefit of this is that further third party apps with configuration profile support can be added without any changes to the profile manager app 50.

The profile manager app 50 is set up to communicate with the server 12, to receive configuration profiles 22, 24 for possible eventual application to third party apps 70, 72. The profile manager app 50 also includes a URL handler 56, which allows it to be opened by the third party apps 70, 72 and to receive data from them. Prior configuration profiles may also be stored in the memory 16. The profile manager app 50 also stores prior configuration profiles 25.

Third party apps 70, 72 and possibly other third party apps are stored in memory 40 of device 28. Each third party app 70, 72 to be provided with settings from a respective configuration profile 22, 24 includes a respective library 74, 76. In other embodiments within the purview of the present invention, such a library may be shared between third party apps, rather than being embedded in each individual one. The libraries 74, 76 provide the common functionality of two-way communication with the profile manager app. Each third party app 70, 72 has a URL handler 91, 92 that receives and processes URL commands from the profile manager app 50. Each of these URL handlers 91, 92 must be registered with a unique URL scheme in order to be able to uniquely address a specific third party app. Configuration profile data received in the URL handlers 91, 92 is extracted from them by the library 74, 76. The libraries 74, 76 provide a class 80 that forwards configuration profile settings to delegates 94, 96. The class has a method 82 for setting a configuration profile and another method 84 for removing a configuration profile. A configuration profile may be set in whole or in part, or it may be removed in whole or in part. Current or existing configuration profiles may be updated. On removal of a configuration profile, the third party app 70, 72 can also remove any stored data relating to the profile. The actual configuration profile is set by the corresponding delegate 94, 96 in each of the third party apps 70, 72.

As shown in FIG. 1, third party app "App A" 70 has default, or blank settings 90, which may later be replaced by settings from configuration profile "Pr. A" 22. Third party app "App B" 72 has already had its configuration profile settings "Pr. B" 24A set.

Process

Figure 2:
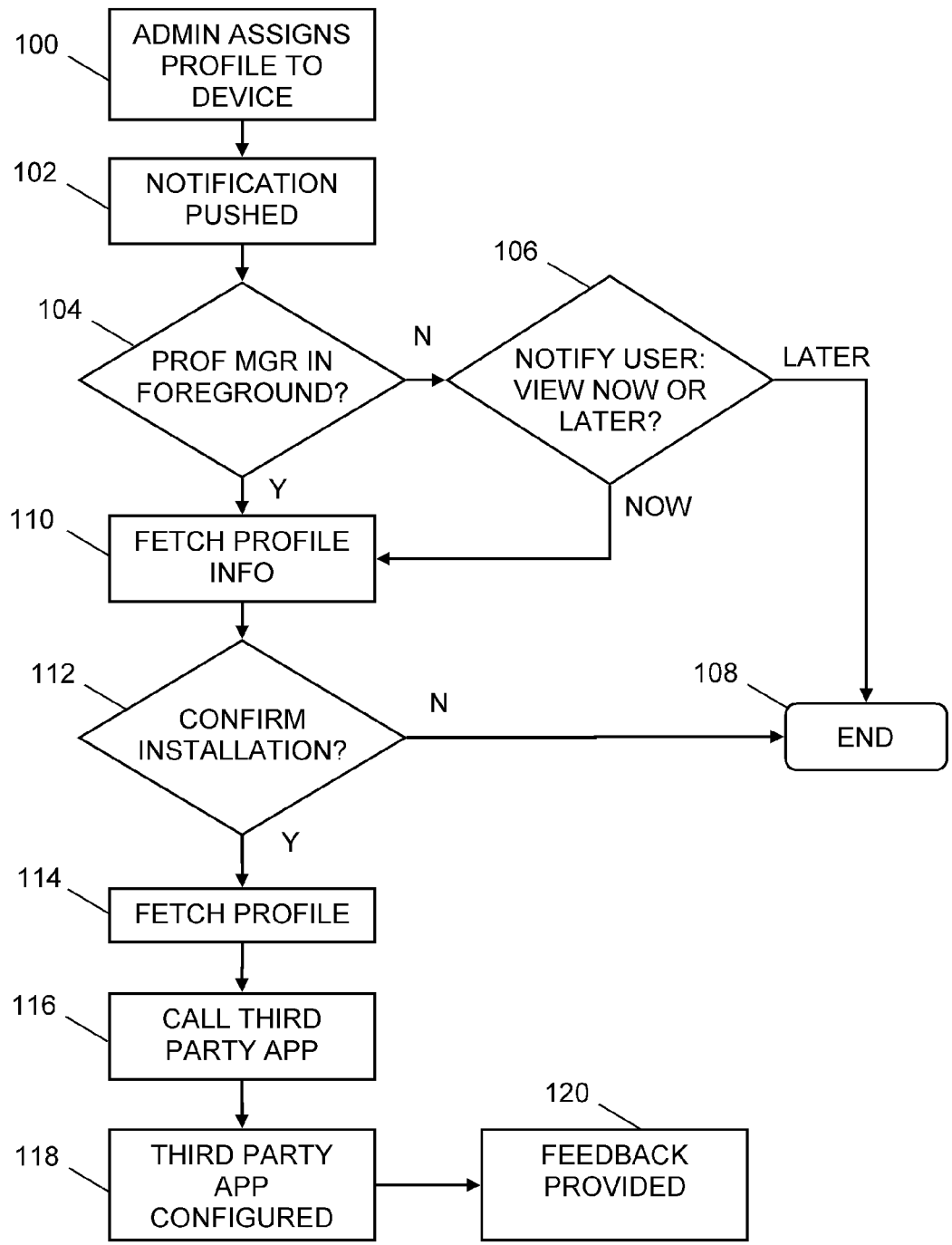
FIG. 2 is a flowchart of a process performed by an electronic device when configuring a third party app.

Referring to FIG. 2, a high-level flowchart is shown of a process carried out by the system 10.

Prior to the process, an administrator responsible for a group of one or more remote, mobile devices 28 has created a new configuration profile, such as profile 22, to be applied to the respective third party app 70, using an administrator's management console 34 on terminal 32 connected to the server 12.

In step 100, the configuration profile 22 is assigned to a particular device 28. While it may be assigned directly, it may alternately be assigned to a device 28 by way of a policy, in which one or more devices are identified to receive the configuration profile 22, which may itself be one of several configuration profiles assigned to the device.

In step 102, a message is sent from the server 12 to the mobile device 28 that is to receive the configuration profile 22. This may be a push notification, for example. In alternate embodiments, other known methods for the device 28 to obtain the message may be used.

In step 104, after receipt of the notification, which typically contains an identifier of the profile manager app 50, the operating system of the mobile device 28 determines whether the profile manager app is running as the foreground app in the mobile device. If the profile manager app 50 is not running in the foreground (i.e. suspended or unopened), a pop-up message appears on the device 28 in step 106, notifying the user of the device that a new configuration profile 22 is available. Note that in some embodiments, step 104 may be omitted. The notification can be of any appropriate form, and may include buttons such as "View Now" and "View Later", one of which can be selected by the user depending respectively on whether the user wants to view the new profile now or later. Other methods of notification may alternately be used, such as email or text messaging. Other buttons or other titles for the buttons may be used in other embodiments. If the user selects "View Later", the process ends at step 108, but if the user selects "View Now", then information about the new configuration profile 22 is fetched from the server in step 110. This information may be, for example, the name of the third party app, the reason for the change, the level of importance, etc. If the process ended at step 108, the following time that the user brings the profile manager app to the foreground, step 110 will be executed and all the following steps will continue from there on.

If, at step 104, the profile manager app 50 is already running in the foreground on the device 28, then the process would move directly to step 110, in which information about the new configuration profile 22 is retrieved from the server 12 and stored in the repository within the profile manager app.

After the device 28 has received information about the configuration profile 22, a confirmation request is displayed on the device in step 112, asking whether the user wants to apply the configuration profile. Note that step 112 may be optional in other embodiments. The user is given a choice of "Cancel" and "OK". If the user selects "Cancel", the process ends at step 108. If, however, the user selects "OK", then, in step 114, the configuration profile 22 is fetched from the server 12. In following step 116, the third party app 70, to which the configuration profile 22 is destined, is called using a URL based command, with the configuration data appended in the command. In step 118, the third party app 70 then comes to the foreground, either from the background state or from being completely off, and instructions contained in the library 74 incorporated in the third party app 70 are executed to apply the new configuration profile 22. Note that in certain operating systems the third party app may not be brought to the foreground. After the library 74 has executed, feedback is provided in step 120 to the profile manager app 50, informing it of success, partial success or failure, for example.

Feedback messages are reported back to the profile manager app 50 again using a URL based command. This callback command is compiled and invoked by the library 74, and causes the third party app to close down or suspend its operation, and the profile manager app 50 to come to the foreground.

Figure 3:
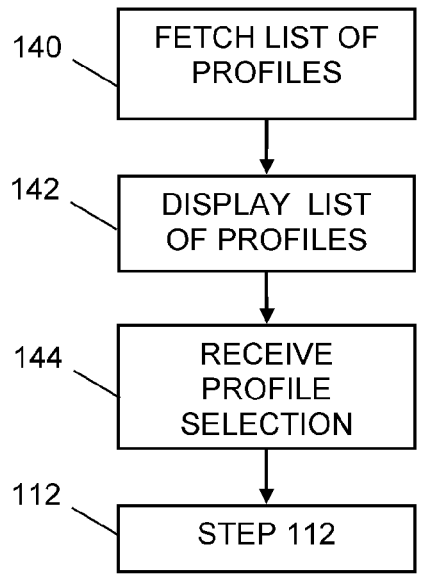
FIG. 3 is a flowchart of a process performed by an electronic device when providing a user with options to configure one or more third party apps.

Depending on the operating system, however, the profile manager app 50 may not come to the foreground if there is no error. In other cases, the profile manager app 50 may stay in the foreground. Also note that depending on the operating system, the third party app and the profile manager app may continue receiving CPU cycles in the background. On some operating systems the full workflow could all be executed without either the third party app or the profile manager app coming to the foreground. In cases where the setting of the new configuration profile has been stopped by the user, it may be completed at a later time when the user opens the profile manager app 50. For example, now referring to the flowchart of FIG. 3, in step 140 the profile manager app 50, having been brought to the foreground by the user, fetches a list of available configuration profiles from the server 50.

In step 142, the profile manager app 50 displays a list of the available configuration profiles to the user. In step 144, the profile manager app 50 receives a selection from the user indicating which of the profiles is to be installed. The next and subsequent steps are the same as step 112 and subsequent ones as shown in FIG. 2. In some embodiments, more than one profile may be selected, each one being set sequentially via a series of URL commands. The selection of a profile may be considered to be confirmation (as in step 112) that it is to be installed.

Figure 4:
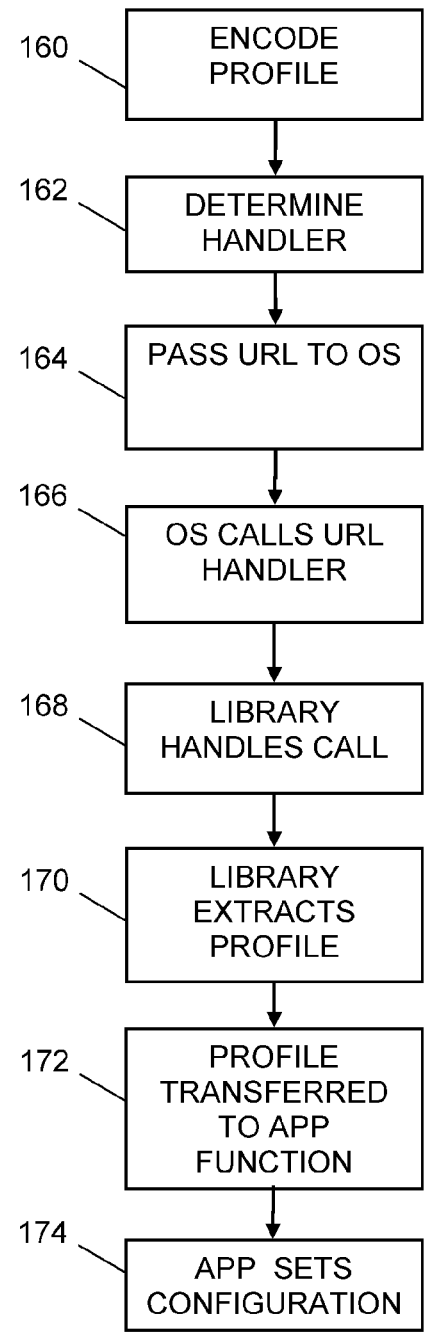
FIG. 4 is a more detailed flowchart of the last two steps of the process described in FIG. 2.

Referring to FIG. 4, a flowchart is shown which corresponds to steps 116-118 of FIG. 2, in more detail. Before the start of this process, it is assumed that the configuration profiles 22, 24 are already stored in the profile manager app 50 in device 28, but not yet installed in their respective third party apps 70, 72.

In step 160, the configuration profile data is encoded from XML into Base64, and may optionally be encrypted beforehand. Alternately, the configuration profile data is not encoded from XML, but from a binary plist format, which is more efficient. In step 162, based on the content in the configuration profile, the profile manager app 50 determines which third party app to call (or, equivalently, which URL handler to call) and compiles a URL command based on the URL scheme corresponding to the third party app. The URL scheme is provided in the configuration profile itself so that the profile manager app does not need to have any specific knowledge about the different third party apps it is required to configure. This makes the system 10 extremely flexible. In step 164, the URL command is passed to the operating system, which, in step 166, closes down the profile manager app 50 and opens the corresponding third party app, calling its URL handler.

In step 168, the library 74 incorporated in the third party app handles the URL call, and in step 170, the library extracts the configuration profile data from the corresponding parameter in the URL command. In step 172, the extracted configuration profile data is passed to a delegate 94 within the third party app that can configure it. In step 174, the delegate within the third party app undertakes the configuration.

Figure 5:
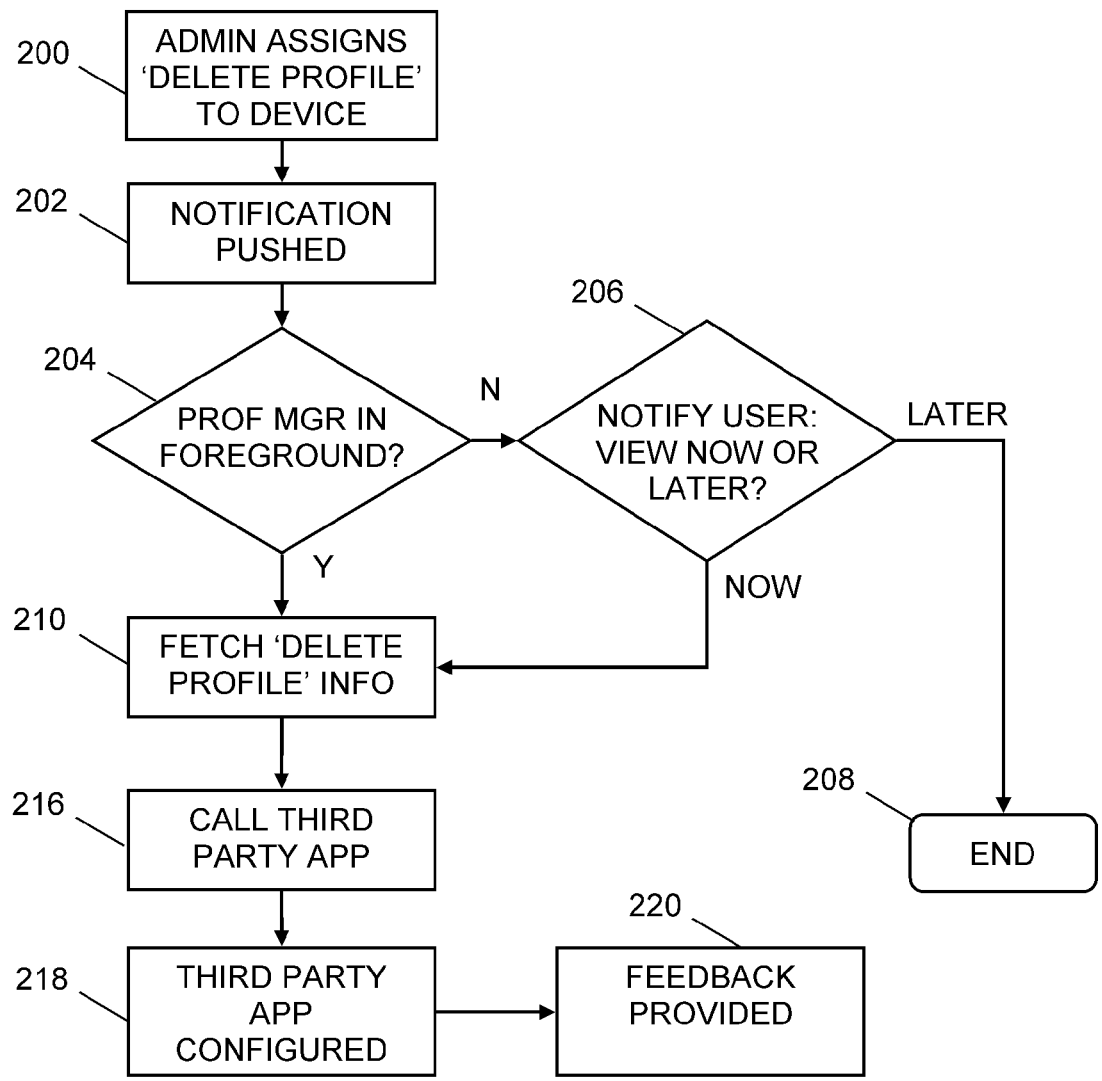
FIG. 5 is a flowchart of a process performed by an electronic device when removing a configuration profile from a third party app.

Referring to FIG. 5, a high-level flowchart is shown of a process carried out by the system 10 for removing a current configuration profile setting from a third party app. Many of the steps are similar to those shown in FIG. 2. This resetting is achieved by replacing the existing settings with prior settings 25 that are stored in the profile manager app 50. If there are no prior settings, then null values are used.

Prior to the process, an administrator responsible for a group of one or more remote, mobile devices 28 has specified that a configuration profile is to be removed from a third party app, using an administrator's management console 34 on terminal 32 connected to the server 12.

In step 200, a 'Delete Profile' instruction is assigned to a particular device 28. While it may be assigned directly, it may alternately be assigned to a device 28 by way of a policy, in which one or more devices are identified to receive the Delete Profile instruction.

In step 202, a message is sent from the server 12 to the mobile device 28 that is to receive the Delete Profile instruction. This may be a push notification, for example. In alternate embodiments, other known methods for the device 28 to obtain the message may be used.

In step 204, after receipt of the notification, which typically contains an identifier of the profile manager app 50, the operating system of the mobile device 28 determines whether the profile manager app is running as the foreground app in the mobile device. If the profile manager app 50 is not running in the foreground (i.e. suspended or unopened), a pop-up message appears on the device 28 in step 206, notifying the user of the device that a current configuration profile is to be removed, or simply that a current configuration profile needs to be updated. Note that in some embodiments, step 204 may be optional. The notification can be of any appropriate form, and may include buttons such as "View Now" and "View Later", one of which can be selected by the user depending on whether the user wants to view the updated profile (or instruction for the current profile's removal), now or later. If the user selects "View Later", the process ends at step 208, but if the user selects "View Now", then information about the current configuration profile to be deleted is fetched from the repository of the profile manager app in step 210. This information may be, for example, the name of the third party app, the reason for the change, the level of importance, etc. If the process ended at step 208, the following time that the user brings the profile manager app to the foreground, step 210 will be executed and all the following steps will continue from there on.

If, at step 204, the profile manager app 50 is already running in the foreground on the device 28, then the process moves directly to step 210, in which information about the current configuration profile to be deleted is retrieved from the repository within the profile manager app.

In step 216, the third party app from which the current configuration profile is to be removed, is called using a URL based command, with null or prior values of configuration data appended in the command. In step 218, the third party app then comes to the foreground, either from the background state or from being completely off, and instructions contained in the library incorporated in the third party app are executed to apply the null or prior configuration profile, effectively removing the existing one. Note that in certain operating systems the third party app may not be brought to the foreground. After the library has executed, feedback is provided in step 220 to the profile manager app 50, informing it of success, partial success or failure, for example. Feedback messages are reported back to the profile manager app 50 again using a URL based command.

Exemplary Embodiment

Below is a description of an exemplary embodiment for an operating system such as iOS and profile manager app such as AbsoluteApps™ provided by Absolute Software. Many of these details are examples only, not limitations.

Library Definition

The library 74 implements a class named "ABTConfigManager", which is the main API that the third party app developers interact with. The class is designed as a singleton and is instantiated and configured by the code in the third party app once at application startup. The following examples are illustrated using Objective C code, a standard programming language for iOS application development.

-[UIApplicationDelegate applicationDidFinishLaunching:]

The class is guaranteed to be called before the URL handler of the third party app. Also, the code in the third party app calls the following in its URL handler:

-[ABTConfigManager handleConfigURL:]

This method will return a Boolean indicating whether the configuration URL was handled or not, so that it is very easy for the third party app to integrate by making this the first call in its URL handler, continuing to process its own URLs only if the ABTConfigManager did not handle the configuration URL.

When the third party code configures the ABTConfigManager, it specifies a delegate to be called when configuration requests are received. This delegate is responsible to apply or reset configurations, thus it implements two methods:

```
@protocol ABTConfigManagerDelegate
- (BOOL)applyConfigurationSet:(ABTConfigurationSet*) inConfiguration;
- (BOOL)revertConfigurationSet:(ABTConfigurationSet*)
inConfiguration;
@end
```

The first method is called when a new configuration needs to be applied, and the second method is called when a previously applied configuration is removed, i.e. when the corresponding values need to be reset to default values. When the delegate of the third party app applies a configuration, it is assumed that all configuration values have been applied if the applyConfiguration: method returns YES. If third party delegate only applies one or some of the values contained in the profile, it should call, for each key that was applied, one of the following:

```
-[ABTConfigurationSet didApplyConfigurationForKey:]
-[ABTConfigurationSet didApplyConfigurationForKey: oldValue:]
```

Alternatively, for each key that was not applied, the delegate can call:

-[ABTConfigurationSet didNotApplyConfigurationForKey:]

In this case, the ABTConfigManager assumes that all other keys were correctly applied.

This recording is used to specify which values configured by a configuration profile need to be reset to default values when a configuration profile is removed. Also, if the third party code calls -[ABTConfigurationSet didApplyConfigurationForKey: oldValue:] to register the applied values, the old value passed will be used to perform a rollback if application of the profile fails.

Third Party Developer Tasks

The third party developer implements the following:

1. Register a dedicated, unique custom URL scheme, defined to be

"x-absolutemanageconfig."+bundle identifier

2. Instantiate and configure ABTConfigManager
3. Call -[ABTConfigManager handleConfigURL:] in the third party app delegate's URL handler
4. Implement the ABTConfigManagerDelegate protocol and handle methods to apply/reset configuration sets.

When the third party code implements all of the above, configuration profile support for the third party app will be available and manageable through Absolute's™ mobile device management console.

Implementation Details

The library is implemented as a static link library plus header file, since this is a requirement as per the iOS SDK (Software Development Kit). When ABTConfigManager is instantiated, it grabs the bundle identifier via:

-[NSBundle mainBundle]

The third party developer provides an API key that is used in conjunction with the bundle identifier to validate the token passed in the URL. The bundle identifier is used to determine the default URL scheme and for validation of the token passed in the URL. This is to ensure a safe communication channel and disallow others from using the URL handler as a backdoor for sneaking in settings. The URL sent by AbsoluteApps™ consists of the following components:

Action: This can either be "SetConfiguration" or "RemoveConfiguration", for example. In other embodiments, different strings such as "apply" and "reset" may be used.

Token: This is a secure token generated from the bundle identifier to verify that the URL was indeed sent from AbsoluteApps™, assuming that only AbsoluteApps™ has the knowledge to create a valid token.

ConfigProfileData: This is the compressed and optionally encrypted configuration profile data. The key in the URL will be different ("data"), but this is the meaning of that component.

If ABTConfigManager recognizes the URL as being a "Set Configuration Profile" URL, by checking the URL scheme, it always returns YES from -[ABTConfigManager handleConfigURL:], regardless of whether the parameters are valid or not. This ensures that the third party code is not trying to handle URLs that are generated by Absolute Software but for some reason have invalid parameters. When processing a "Set Configuration Profile" URL, ABTConfigManager first verifies the token to ensure that it is a legal call to modify the configuration. If the token is not valid, a message is printed to a log file and the error is reported back to AbsoluteApps™ via the callback URL. If the token exists and is valid, ABTConfigManager unpacks the configuration profile data and calls the delegate's method for each payload contained in the configuration profile by constructing a temporary ABTConfigurationSet object for each payload. When the third party delegate returns YES from its delegate method and the action was "SetConfiguration", ABTConfigManager collects the keys of the modified configuration values from the ABTConfigurationSet object and passes that information back to AbsoluteApps™, so that the keys to be reset are recorded.

For "RemoveConfiguration" actions, only the final result is reported back to AbsoluteApps™, since we do not need to record which configuration values have been reset.

Payload data—The dictionary sent in the URL is described in Appendix 3. The dictionary is flattened into binary property list format, prefixed with a magic byte sequence, compressed using Zlib and, for the library with encryption support, encrypted. The resulting data is Base64 encoded and passed in the URL. By repacking the configuration file data (removing unneeded values), using binary plist format and compressing, a manageable amount of data is obtained that can be passed in the URL.

The code in the library that decodes the payload data should be stable with respect to invalid data. For example, it should not try to allocate arbitrary amounts of memory (e.g. due to a maliciously crafted Zlib archive) and it should verify the type of the data sent (e.g. by checking the first bytes of the data to verify that the unpacked data is in fact a binary plist).

Encryption—Two versions of the library are provided: one without encryption, for customers that do not yet use encryption in their apps and do not want to go through the process of declaring and/or registering their use of encryption with the US Bureau of Industry and Security or other registration offices for country-specific regulations regarding the use of strong encryption; and one with strong encryption for customers that either already use strong encryption in their apps or have the security requirements and thus already have done or don't mind going through the registration process.

The encryption level is specified in the configuration profile, either at the top level or per payload using the key "com.absolute.thirdpartyconfig.DataEncryption" (Boolean value). If the profile/payload specifies strong encryption and this is sent to an app that is linked against the library without encryption, trying to install the configuration profile will fail (i.e. the library will report back an appropriate error).

The library with encryption can be configured to allow unencrypted data, but it will default to only allowing encrypted data. If it is not configured to allow unencrypted data, trying to install a configuration profile without encryption will fail.

The encryption uses Blowfish as the encryption algorithm, using a hash of the bundle identifier plus a fixed secret key as the encoding key. Other encryption algorithms may of course be used in other embodiments. It is important to correctly identify valid un-encoded data, so that the code that decrypts the data has a way of verifying whether the decoded data is valid. This can be a unique header used by Zlib when compressing the data or another magic byte sequence. In any event, data that obviously was not decoded correctly (e.g. because the URL was called by a malicious third party app) is not proceeded with, and the process is abandoned.

URL format—The URL command has the following components:

1. The URL scheme defaults to a prefix "x-absolutemanageconfig." concatenated with the third party app's bundle identifier, e.g. "x-absolutemanageconfig.com.acmetop.acmetopapp://..." (Note that the third party app can also, optionally, register a custom URL scheme)

2. The URL contains a verb as the "host" part which specifies whether this is a request to apply (install) or reset (remove) a configuration profile:
  "apply" to apply configuration profile settings
  "reset" to reset configuration profile settings
3. The URL contains the following parameters:
  a. "token": the authentication token created as a hash from the third party app's bundle identifier.
  A bundle identifier uniquely identifies a third party app.
  b. "profile": the unique identifier for the profile being applied; this needs to be passed to the callback URL
  c. "payload": the unique identifier for the payload being applied; this needs to be passed to the callback URL
  d. "data" or "data-x": respectively the unencrypted or encrypted configuration data (packed dictionary as described above)

Whether "data" or "data-x" is used is decided based on the "DataEncryption" flag in the profile/payload, as described above in relation to encryption. The library without encryption support does not check for the "data-x" parameter and thus fails when passed encrypted data.

Note: If the third party app registers a custom URL scheme instead of using the default URL scheme as described above (using -[ABTConfigManager configureWithURLScheme: delegate:]), this URL scheme must be specified in the configuration profile payload using a string value with key "com.absolute.thirdpartyconfig.URLScheme".

Examples of URL commands are:

```
xabsolutemanageconfig.com.acmetop.acmetopapp://apply?token=
fde756b3cd91af4b&profile=7B30149C-21CC-4838- B72A-
5B560519B907&payload=56800EBF-842D-4C97-986A-
582620690D91&data=2d3f...
xabsolutemanageconfig.com.acmetop.acmetopapp://apply?token=
fde756b3cd91af4b&profile=7B30149C-21CC-4838- B72A-
5B560519B907&payload=56800EBF-842D-4C97-986A-
582620690D91&data-x=5efa7bdc...
xabsolutemanageconfig.com.acmetop.acmetopapp://reset?token=
de756b3cd91af4b&profile=7B30149C-21CC-4838- B72A-
5B560519B907&payload=56800EBF-842D-4C97-986A-
582620690D91&data=2d3f...
```

For a custom URL scheme, the URL would be, for example:

```
acmetopappconfig://apply?token=fde756b3cd91af4b&profile=7B30149C-
21CC-4838-B72A-5B560519B907&payload=56800EBF-842D-4C97-
986A-582620690D91&data=2d3f...
``` and the corresponding payload in the configuration profile (cf. Appendix 2) must contain the URL scheme specifier:

```
<dict>
  <key>PayloadContent</key>
  <array>
    <dict>
      ...
      <key>PayloadVersion</key>
      <integer>1</integer>
      <key>com.absolute.thirdpartyconfig.BundleIdentifier</key>
      <string>com.acmetop.acmetopapp</string>
      <key>com.absolute.thirdpartyconfig.URLScheme</key>
      <string>acmetopappconfig</string>
      <key>com.absolute.thirdpartyconfig.DataEncryption</key>
      <true/>
      <key>com.absolute.thirdpartyconfig.Category</key>
      <string>ACMETOP App Settings</string>
      <key>com.absolute.thirdpartyconfig.Configuration</key>
```

```
<dict>
  ...
```

Callback URL—The library uses a fixed callback URL of "absoluteapps://thirdpartyprofilestatus" to report the status of the configuration request. Once ABTConfigManager has finished processing the configuration request, it calls back to AbsoluteApps™ using the callback URL, providing status information as follows:
  1. The "profile" parameter is provided as part of the request URL and contains the "PayloadUUID" value of the configuration profile itself
  2. The "payload" parameter is provided as part of the request URL and contains the "PayloadUUID" value of the payload sent in the request URL
  3. The "token" parameter is the token sent in the configuration URL. This allows some basic verification that this callback was actually invoked as a callback operation from one of AbsoluteApps' configuration calls.
  4. The "status" parameter specifies the result status of the action. Possible values are Success, Error or Canceled.
  5. For "apply" actions with status "success" only, the "changedValues" parameter contains an array containing the keys of the modified values in compressed, binary plist format, encoded as Base64.
  6. For any action with status "error", the optional "errorCode" parameter contains a numeric error code identifying the error reason and the optional "errorMessage" parameter contains a short error message describing the error Examples of callback URL messages are:

```
absoluteapps://thirdpartyprofilestatus?profile=7B30149C-21CC-4838-
B72A-5B560519B907&payload=56800EBF-842D-4C97-986A-
582620690D91&token=fde756b3cd91af4b&status=
success&changedValues=3e4f674d3d...
absoluteapps://thirdpartyprofilestatus?profile=7B30149C-21CC-4838-
B72A-5B560519B907&payload=56800EBF-842D-4C97-986A-
582620690D91&token=fde756b3cd91af4b&status=error&errorCode=
13&errorMessage=Something%20bad%20happened%2E
```

Multiple payloads—Support is provided for multiple payloads in a third party configuration profile, but these are split into separate URL requests in AbsoluteApps™. Each configuration URL only handles a single payload. This allows configuration profiles to be created that, for example, configure an entire set of third party applications, with one payload for each third party application. If a third party application is not available on the device, installing the configuration profile by AbsoluteApps™ will still succeed for the third party applications that are installed. If a payload corresponds to a third party app that is not installed, this does not make the entire configuration profile fail—the corresponding payload is just ignored. As far as the ABTConfigManager implementation is concerned, each configuration call will only contain a single dictionary with one set of settings.

Atomicity—It is possible to implement some atomicity with respect to applying configuration profiles by allowing the rollback of applied values automatically when an attempt to apply a configuration profile fails. For this purpose, the third party developer can call [ABTConfigurationSet didApplyConfigurationForKey: oldValue:] for each value that has been applied, passing the old value (or nil if no value was set before). If the developer registers the applied keys plus old values, the library code can rollback the applied values by creating a new ABTConfigurationSet which contains only the applied keys together with the old values and calls the delegate again to apply back the old values before reporting the error back to AbsoluteApps™. However, due to the nature of the integration (i.e. it is the third party developer's responsibility to register applied values, AbsoluteApps™ does not know about the order of the values, etc.), 100% atomic operations cannot be provided. When there are multiple payloads in a configuration profile, the atomicity only extends to each payload, but not across payloads.

Removing a configuration profile—When removing a configuration profile, the third party app is called via the URL handler with an action "reset" and the list of keys to reset is passed. This list of keys is compiled depending on the third party app's behavior when the configuration profile was applied with respect to calling these ABTConfigurationSet methods:

```
-[ABTConfigurationSet didApplyConfigurationForKey: oldValue:]
-[ABTConfigurationSet didApplyConfigurationForKey:]
-[ABTConfigurationSet didNotApplyConfigurationForKey:]
```

If the third party app did not call any of the above methods while applying the configuration profile values, the list of values to reset will contain all keys that are present in the configuration profile.

If the third party app only called -[ABTConfigurationSet didNotApplyConfigurationForKey:], the list will contain all keys that are present in the configuration profile excluding the keys that were recorded using this method If the third party app tracked each modified value using one of the didApplyConfigurationForKey: methods, the list will contain only the keys recorded using these methods.

If the third party app should report using a mixture of didApplyConfigurationForKey: and didNotApplyConfigurationForKey: messages, the set of keys recorded through didApplyConfigurationForKey: will be used, since this will in most cases produce a more accurate set of applied keys.

The third party app's delegate is sent the revertConfigurationSet: message with an ABTConfigurationSet containing the list of keys to reset as described above. It is important to note that since we do not preserve the old values once the configuration profile has successfully been applied, the old values will not be available to the third party app. In this case, only the following methods of the ABTConfigurationSet object will return valid keys:

```
- (NSArray*)allConfigurationKeys;
- (void)enumerateConfigurationKeysAndValuesUsingBlock:(void (^)(id key, id value, BOOL *stop))block;
```

For the enumeration method, nil will be passed for the "value" parameter.

Example Use

In a corporate scenario, an app with the profile manager app functionality may be downloaded to every employee's mobile device. An example of such app is AbsoluteApps™, provided by Absolute Software. If a profile manager app can obtain configuration profiles for the various third party apps, then these third party apps can be configured with very little effort of the part of the user, or even automatically. Company IT administrators may push the third party apps and the profile manager app to the employees' devices, as well as any updates to them.

Another aspect of the invention is its use for server based applications, where data is stored on the mobile device. With an external configuration/communication method as described herein, the system will allow an administrator or remote server to remotely instruct the third party application to remove data from the mobile device. Data removal is not a function of the library, but a function of the third party app that is triggered by the configuration profile removal.

An example of such a use may be the configuration and subsequent de-configuration of an email account. An email account may be configured via the system 10, with no further user interaction needed. When an employee leaves a company, it may be desirable to remove the configuration profile and together with it all the stored data, such as company emails.

Variations

The entire processes described above may be carried out entirely in the background, with none of the apps being brought to the foreground, whether it be the third party apps or the profile manager app.

An additional case is where the system is used to configure apps that are provided as part of the operating system. Such apps may have the libraries embedded or they may have access to shared versions, and the library may be provided as part of the operating system.

Another additional case is where the system is used to configure an entire set of applications depending on certain conditions (e.g. department/organizational unit of the device user), such that the entire set of applications is configured consistently and will be reset once the user no longer meets the requirements.

The system can be used to transfer configurations in a safe and secure manner, since the entire communication can be encrypted and the user will never have to see or handle the unencrypted configuration parameters, which otherwise would need to be transferred via semi-insecure channels (e.g. sending user credentials by mail, passing along user credentials manually or on the phone, etc.).

Configurations could be force-removed if, for example, the integrity of a device can no longer be guaranteed. This could occur when an iOS device has been jailbroken and company policy requires the configurations not to be stored on devices that may potentially be compromised.

If a new configuration profile is not applied, the user may be reminded from time to time using a notification.

More than one configuration profile may be applied to the device for the same third party app. For example, it may be simpler to manage the provision of profiles if they are broken down into constituent portions.

In another embodiment, when a user starts the profile manager app, or brings it to the foreground, then configuration profiles may be automatically installed, without the user being given the option to confirm.

In yet other embodiments, no confirmations or messages are displayed at all.

The library can be provided to the third party app developers in binary form, to shield all mechanics from the app developer. All the developer will need to do is to have a few delegate functions implemented. The library will call the delegates with a configuration set object that allows to iterate the fields that should be configured or set to default values.

On platforms using programming languages that do not allow for dynamic delegation, other mechanisms can be used, e.g. using abstract classes and/or abstract methods or callback functions.

When a user opens the third party app directly, no configuration profile is supplied in the command to open it. However, in another embodiment, the third party app may include a library to proactively check the profile manager app to see whether there is a configuration profile to be installed. The profile manager app will then provide the configuration profile to the third party app in a return URL command.

In FIG. 2, the configuration profile may be fetched at the same time as the information about the profile, which means that step 114 would occur before step 112.

A user may be able to remove a profile if allowed, optionally requiring a password for removal.

Any type of data can be contained in the profile manager app.

For larger amounts of data, the process can be repeated several times until all the data has been passed from the profile manager app to the third party app. In that case the configuration profile data is passed in data chunks (partial configuration profiles) via subsequent URL calls.

Besides the configuration of company recommended apps, this process can be used to allow any two or more apps to communicate with each other.

The process may be one way, in that it is initiated from the profile manager app and just sends configuration data to the third party app. This is simpler, but less than ideal because there is no feedback to the profile manager app.

The functionality of the profile manager app may be embodied in the operating system rather than in a third party application.

Types of encoding other than XML or binary plist format and Base64 may be used.

Communication modes other than URL commands may be used. The principles disclosed herein can apply to other restricted communication methods that can exist in a sandboxed or other equivalent environment.

Parts of the code may be located in locations different to the ones shown herein.

Library code may be distributed as a shared library instead of a static link library being embedded in third party application.

The system may be used for mobile application management in general, rather than specifically for configuration profile management.

The format of the URL command may be changed to follow a standard if ever one is developed.

While this invention is particularly suited to iOS operating systems, it may be applied where other types of operating system are used.

In other embodiments, the profile manager app on the remote device may be supported by an agent. Such an agent, as used herein, is a software, hardware or firmware (or any combination thereof) agent that is ideally persistent and stealthy, and that resides in a host computer or other electronic device. The agent facilitates servicing functions which require communication with a remote server. The agent is tamper resistant and is enabled for supporting and/or providing various services such as data delete, firewall protection, data encryption, location tracking, message notification, and software deployment and updates. An illustrative embodiment of a suitable agent is found in the commercially available product Computrace Agent™. The technology underlying the Computrace Agent™ has been disclosed and patented in the U.S. and other countries, the patents having been commonly assigned to Absolute Software Corporation. See, for example, U.S. Pat. Nos. 5,715,174; 5,764,892; 5,802,280; 6,244,758; 6,269,392; 6,300,863; 6,507,914; and 7,945,709; and related patents filed outside the U.S. Details of the persistent function of the agent are disclosed in U.S. Patent Application Publication Nos. US2005/0216757 and US2006/0272020. All of these documents are fully incorporated by reference as if fully set forth herein. Ideally, the agent is also persistent, and able to self-repair if it includes software. It may in part or in whole be located in the BIOS or equivalent location in an electronic device. Communications may be initiated by the agent, by the remote server or by both. The agent may be divided into multiple parts in different locations within an electronic device. The agent may ensure the presence of the safe and its integrity, and if it is found to be compromised or out of date, it can initiate the download of a new safe from the server.

Implementations on iOS devices typically do not involve an agent supporting the system. Instead, a configuration profile is deployed which allows the device to be "enrolled", thus allowing it to be managed using the native features already available on the device. However, if the system is implemented on Android™ devices, for example, it would typically be supported by an agent.

In some embodiments an agent is not needed at all. Also an enrollment process is not needed as the installation of the profile manager app may be seen as the enrollment process. Once launched, the profile manager app would send additional information to the server.

The present description includes the best presently contemplated mode of carrying out the subject matter disclosed and claimed herein. Steps may be performed in a different order to those shown herein. Some steps may be omitted or repeated, and other steps may be added. Repositories may be organized in different ways. While specific terminology may have been used herein, other equivalent features and functions are intended to be included. The description is made for the purpose of illustrating the general principles of the subject matter and not be taken in a limiting sense; the claimed subject matter can find utility in a variety of implementations without departing from the scope of the invention made, as will be apparent to those of skill in the art from an understanding of the principles that underlie the invention.

APPENDIX 1

API Declaration

API declaration for the ABTConfigManager related classes:

ABTConfigurationSet—This class encapsulates a set of configuration values that should be applied together:

```
@interface ABTConfigurationSet : NSObject {
}
@property (readonly) NSString* configurationCategory;
- (NSDictionary*)allConfigurationEntries;
- (NSArray*)allConfigurationKeys;
- (NSEnumerator*)configurationKeyEnumerator;
- (void)enumerateConfigurationKeysAndValuesUsingBlock:(void (^) (id key, id value, BOOL *stop))block;
- (id)configurationValueForKey:(id)key;
- (void)didApplyConfigurationForKey:(id)key;
- (void)didApplyConfigurationForKey:(id)key oldValue:(id) oldValue;
- (void)didNotApplyConfigurationForKey:(id)key;
- (NSArray*)appliedConfigurationKeys;
@end
```

ABTConfigManagerDelegate—This is the protocol the third party delegate has to implement:

```
@protocol ABTConfigManagerDelegate
- (BOOL)applyConfigurationSet:(ABTConfigurationSet*) inConfiguration;
- (BOOL)revertConfigurationSet:(ABTConfigurationSet*) inConfiguration;
@end
```

ABTConfigManager—This is the class that handles all communication to and from AbsoluteApps™ and also tells the delegate to apply configuration profiles:

```
@interface ABTConfigManager : NSObject {
}
@property (assign) id<ABTConfigManagerDelegate> delegate;
+ (ABTConfigManager*)instance;
- (void)configureWithDelegate:(id<ABTConfigManagerDelegate>)
delegate;
- (void)configureWithCustomURLScheme:(NSString*)urlScheme
delegate:(id<ABTConfigManagerDelegate>) delegate;
- (BOOL)handleConfigURL:(NSURL*)aURL;
@end
```

The third party app needs to instantiate and configure ABTConfigManager before the first URL is handled. A good place is -[NSApplicationDelegate applicationDidFinishLaunching:]. To instantiate and configure, the third party app calls either of the configuration methods:

```
[[ABTConfigManager instance] configureWithDelegate:configDelegate];
or
[[ABTConfigManager instance] configureWithURLScheme:urlScheme
delegate:configDelegate];
```

The first call will assume the standard URL scheme as described above.

APPENDIX 2

Sample Third Party Configuration Profile

```
<?xml version="1.0" encoding="UTF-8"?>
<!DOCTYPE plist PUBLIC "-//Apple//DTD PLIST 1.0//EN"
"http://www.apple.com/DTDs/PropertyList-1.0.dtd">
<plist version="1.0">
<dict>
    <key>PayloadContent</key>
    <array>
      <dict>
        <key>PayloadDescription</key>
        <string>Sample configuration for 3rd party iOS app.</string>
        <key>PayloadDisplayName</key>
        <string>Sample iOS app config</string>
        <key>PayloadIdentifier</key>
        <string>com.acmetop.ios_app_config<string>
        <key>PayloadOrganization</key>
        <string>ACMETOP Ltd.</string>
        <key>PayloadType</key>
        <string>com.absolute.thirdpartyconfig.com.acmetop.
        ios_app_config</string>
        <key>PayloadUUID</key>
        <string>56800EBF-842D-4C97-986A-582620690D91</string>
        <key>PayloadVersion</key>
        <integer>1</integer> <key>com.absolute.thirdpartyconfig.
        BundleIdentifier</key>
        <string>com.acmetop.acmetopapp</string>
        <key>com.absolute.thirdpartyconfig.DataEncryption</key>
        <true/>
        <key>com.absolute.thirdpartyconfig.Category</key>
        <string>ACMETOP App Settings</string>
        <key>com.absolute.thirdpartyconfig.Configuration</key>
        <dict>
            <key>Setting1</key>
            <true/>
            <key>Setting2</key>
            <string>some value</string>
        </dict>
      </dict>
    </array>
    <key>PayloadDescription</key>
    <string>Sample 3rd party config profile</string>
    <key>PayloadDisplayName</key>
    <string>3rd Party test</string>
    <key>PayloadIdentifier</key>
    <string>com.acmetop.ios_app_config</string>
    <key>PayloadOrganization</key>
    <string>ACMETOP Ltd.</string>
```

```
    <key>PayloadRemovalDisallowed</key>
    <false/>
    <key>PayloadType</key>
    <string>Configuration</string>
    <key>PayloadUUID</key>
    <string>7B30149C-21CC-4838-B72A-5B560519B907</string>
    <key>PayloadVersion</key>
    <integer>1</integer>
</dict>
</plist>
```

APPENDIX 3

Dictionary Sent in URL

For the sample configuration profile in Appendix 2, the following dictionary is sent to the third party app via the configuration URL for "apply" requests. Note that the dictionary is displayed as XML for easier reading, but the data sent can be in another format, e.g. binary plist.

```
<plist version="1.0">
<dict>
    <key>Version</key>
    <integer>1</integer>
    <key>Category</key>
    <string>ACMETOP App Settings</string>
    <key>Configuration</key>
        <dict> <key>Setting1</key>
        <true/>
        <key>Setting2</key>
        <string>some value</string>
        </dict>
</dict>
</plist>
```

Here, the "Version" value is used to specify the version of the data protocol used (always "1" in the first implementation). "Category" is the "com.absolute.thirdpartyconfig.Category" value of the payload contents in the configuration profile. "Configuration" is the "com.absolute.thirdpartyconfig.Configuration" dictionary value of the payload contents in the configuration profile. The following dictionary is sent to the third party app via the configuration URL for "reset" requests. Note that the dictionary is displayed as XML for easier reading, but the data sent can be in another format, e.g. binary property list.

```
<plist version="1.0">
<dict> <key>Version</key>
    <integer>1</integer>
    <key>Category</key>
    <string>ACMETOP App Settings</string>
    <key>Configuration</key>
    <array>
        <string>Setting1</string>
        <string>Setting2</string>
    </array>
</dict>
</plist>
```

The invention claimed is:
1. A non-transitory memory having stored thereon a profile manager, said profile manager comprising executable instructions that direct an electronic device to at least:
receive a configuration profile from a remote server;
receive from the remote server information specifying a Uniform Resource Locator (URL) based command scheme; and configure a first application that runs in a sandboxed environment on the device based on the configuration profile by making a call on the electronic device to the first application, the call being made with a URL based command that conforms to the URL based command scheme, wherein the URL based command specifies one or more settings of the configuration profile, wherein an operating system of the electronic device determines that the URL based command corresponds to the first application and passes the URL based command to the first application, the first application including a URL handler capable of processing the URL based command;

wherein the URL based command scheme is a command scheme that the first application registers with the operating system of the device prior to the call, independently of the profile manager; and wherein the profile manager is a second application that runs in the sandboxed environment, and is capable of configuring applications without being programmed with specific knowledge about the applications.

2. The non-transitory memory of claim 1, wherein the operating system responds to the URL based command by opening the first application and calling the URL handler.

3. The non-transitory memory of claim 1, wherein the profile manager is further configured to receive, from the first application, a confirmation that the first application has been configured.

4. The non-transitory memory of claim 1, wherein the profile manager is further configured, prior to receiving the configuration profile, to:
receive a notification of the configuration profile from the server; and
display said notification on the device.

5. The non-transitory memory of claim 1, wherein the profile manager is further configured, prior to receiving the configuration profile, to:
receive information about the configuration profile from the server; and
display said information on the device.

6. The non-transitory memory of claim 1, wherein the configuration profile is:
a new configuration profile;
an updated configuration profile;
a complete configuration profile;
a partial configuration profile; or
a null configuration profile.

7. The non-transitory memory of claim 1, wherein the profile manager is further configured to store one or more prior configuration profiles that have been previously used by the first application, wherein the profile manager further calls the first application with one or more settings of a prior configuration profile.

8. The non-transitory memory of claim 1, wherein the configuration profile is:
compressed;
encrypted; or
both compressed and encrypted.

9. An electronic device comprising non-transient memory storing computer readable code for configuring applications in a sandboxed environment on the electronic device, the code comprising instructions, which, when executed by one or more processors in the device, cause the device to at least:
receive, by execution of a profile manager application that runs in the sandboxed environment on the device, a configuration profile from a remote server, wherein the profile manager application is capable of configuring applications without being programmed with specific knowledge about the applications;
receive, by execution of the profile manager application, information specifying a Uniform Resource Locator (URL) based command scheme from a remote server;
call a target application that runs in the sandboxed environment, the call being made with a URL based command that includes one or more settings of the configuration profile;
extract said settings of the configuration profile from the URL based command; and
configure the target application with said extracted settings of the configuration profile;
wherein the URL based command scheme is a command scheme that the target application has registered with an operating system of the device prior to the call, independently of the profile manager application;
wherein the operating system of the electronic device determines that the URL based command corresponds to the target application and passes the URL based command to the target application for processing by a URL handler of the target application.

10. The electronic device of claim 9, further configured, prior to receiving the configuration profile, to:
receive a notification of the configuration profile from the server; and
display said notification.

11. The electronic device of claim 9, further configured, prior to receiving the configuration profile, to:
receive information about the configuration profile from the server; and
display said information.

12. A method for configuring applications in a sandboxed environment on an electronic device, comprising:
receiving, by a profile manager running in a sandboxed environment on the device, a configuration profile from a remote server, said profile manager capable of configuring applications without being programmed with specific knowledge about the applications;
receiving, by the profile manager, from a remote server, information specifying a Uniform Resource Locator (URL) based command scheme;
calling, by the profile manager, a target application that runs in the sandboxed environment on the device, said call being made with a URL based command that includes one or more settings of the configuration profile and conforms to the command scheme, the command scheme previously having been registered with an operating system of the device by the target application, independently from the profile manager, wherein calling the target application causes the operating system to (1) determine that the URL based command corresponds to the target application and (2) pass the URL based command to the target application for processing by a URL handler of the target application.

13. The method of claim 12 further comprising:
extracting, by a library in the target application, said settings of the configuration profile from the command; and
configuring, by the library, the target application with said settings of the configuration profile.

14. The method of claim 12, wherein the configuration profile is a null configuration profile or a prior configuration profile previously used by the target application, thereby resulting in the calling step being an instruction to remove a current configuration profile from the target application.

15. The method of claim 12, wherein the configuration profile is a partial configuration profile, thereby resulting in the calling step being an instruction to update a current configuration profile in the target application.

16. A system for configuring applications in a sandboxed environment comprising:
a server storing a configuration profile and command scheme data specifying a Uniform Resource Locator (URL) based command scheme for an application;
a profile manager configured to run in a sandboxed environment in an electronic device, the profile manager comprising executable instructions stored in non-transient memory; and
a library of code in the application, the library embodied in one or more non-transient computer-readable media;
wherein the profile manager is configured to at least:
receive the configuration profile from the server;
receive the command scheme from the server; and
call the application with a command that conforms to the URL based command scheme and includes one or more settings of the configuration profile, the URL based command scheme having been registered by the application with an operating system of the device prior to the call, independently of the profile manager, wherein calling the application causes the operating system to (1) determine that the URL based command corresponds to the application, and (2) pass the URL based command to the application;
and wherein the library is configured to at least:
extract said settings of the configuration profile from the command; and
configure the application with said extracted settings of the configuration profile.

17. Non-transient memory storing computer readable code for configuring third party applications in a sandboxed environment on an electronic device, the code comprising instructions formulated as at least a profile manager and a library, the profile manager capable of configuring applications without being programmed with specific knowledge about the applications, wherein the instructions, when executed by one or more processors in the device, cause the device to:
register, by the library when part of an application running in a sandboxed environment, a Uniform Resource Locator (URL) based command scheme with an operating system of the device;
receive, by execution of the profile manager in the sandboxed environment in the device, a configuration profile from a remote server;
receive, by execution of the profile manager, data specifying the URL based command scheme from the server;
call the application, the call being made with a URL based command that includes one or more settings of the configuration profile and conforms to the URL based command scheme, wherein calling the application causes the operating system to (1) determine that the URL based command corresponds to the application and (2) pass the URL based command to the application;
extract, by execution of the library, the one or more settings of the configuration profile from the command; and
configure, by execution of the library, the application with said extracted one or more settings of the configuration profile.

18. The memory of claim 17, wherein the instructions further cause the application to send, to the profile manager, a confirmation that the application has been configured.

19. A non-transitory memory having stored thereon an application configured to run in a sandboxed environment on an electronic device, the application comprising computer readable code, which, when executed by one or more processors in the device, causes the application to:
register a URL scheme with an operating system of the device;
receive, in a URL handler, a command from a profile manager in the device, the profile manager capable of configuring applications without being programmed with specific knowledge about the applications, the command conforming to the URL scheme and including one or more settings of a complete, partial, prior or null configuration profile, wherein the operating system determines that the command conforms to the URL scheme and passes the command to the application;
extract said settings of the configuration profile from the command;
configure itself with said settings of the configuration profile; and
send a confirmation that it has been configured to the profile manager;
wherein the profile manager is a further application that runs in the sandboxed environment.

20. A non-transitory computer readable medium having stored thereon:
a code library that is adapted to be added to an application to enable the application, following installation thereof on a device, to be configured by a profile manager installed on the device, the profile manager capable of configuring applications without being programmed with specific knowledge about the applications;
wherein the code library is configured to direct the device to at least:
register a URL scheme with an operating system of the device;
receive, in a URL handler, a command from the profile manager, the command conforming to the URL scheme and including one or more settings of a complete, partial, prior or null configuration profile, wherein the profile manager provides the command to the application by placing a call to the application, said call causing the operating system to determine that the command corresponds to the application and to pass the command to the application;
extract said one or more settings of the configuration profile from the command;
configure the application with said one or more extracted settings of the configuration profile; and
send a confirmation that the application has been configured to the profile manager;
wherein the profile manager and the application run in a sandboxed environment.

* * * * *